United States Patent Office 3,579,646
Patented May 25, 1971

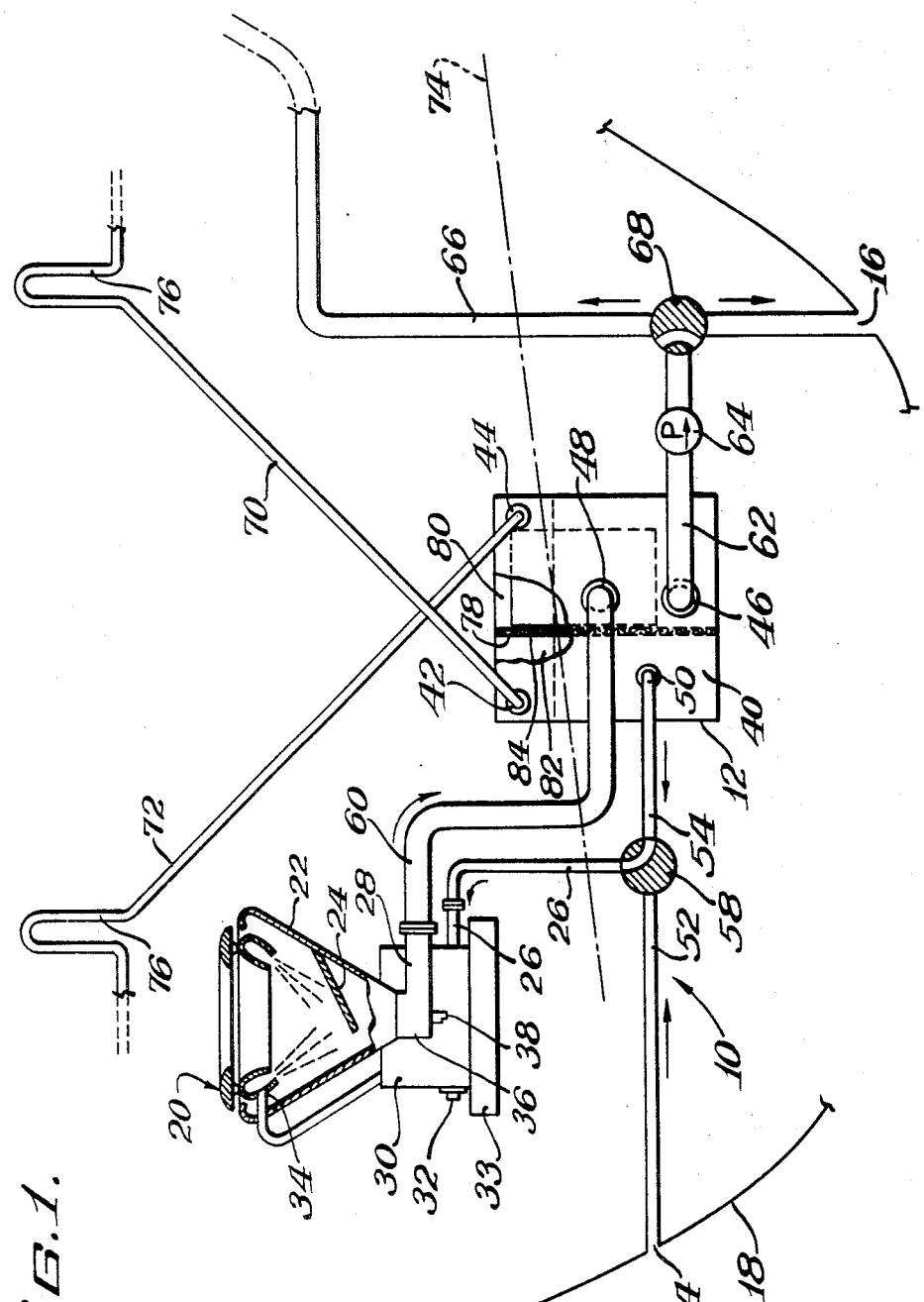

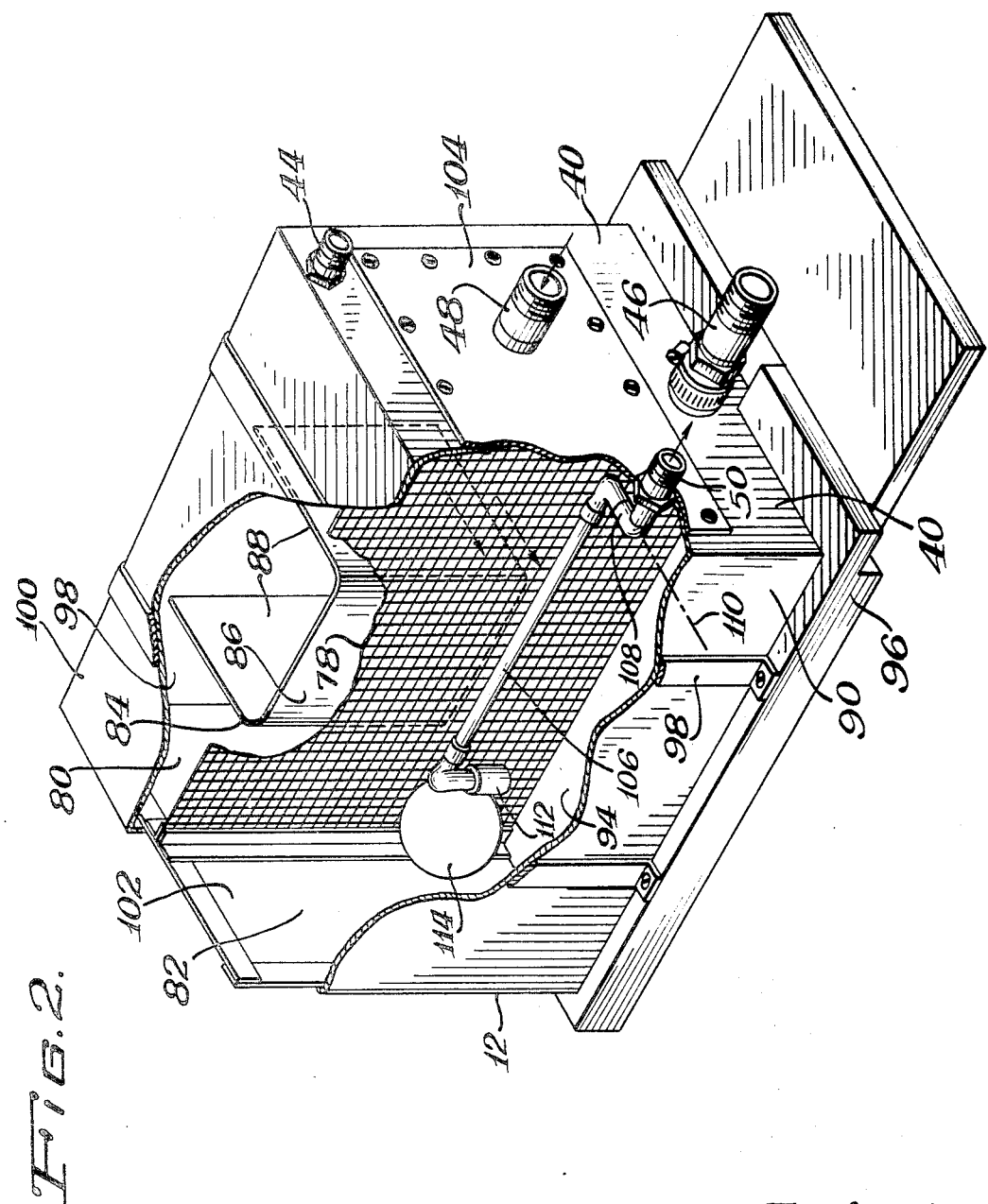

3,579,646
SHIPBOARD RECIRCULATION SEWAGE SYSTEM
Robert L. Lekberg, 4040 W. 123rd St.,
Alsip, Ill. 60658
Filed May 16, 1968, Ser. No. 729,774
Int. Cl. E03d *1/00;* E03f *5/10*
U.S. Cl. 4—10                                               11 Claims

ABSTRACT OF THE DISCLOSURE

Recirculation sewage system for shipboard use having a holding tank which enables the toilet flushing liquid to be re-cycled following removal of sizable particulate matter therefrom in the tank. The tank includes: a chamber part which receives incoming waste discharged by the toilet and in which heavier solids settle out; a longitudinal baffle screen which is self cleaning due to ship motion and which screens out other solids; and a pick up chamber into which the screened liquid is admitted and which has a float-mounted swinging suction pipe through which only surface liquid is drawn from the tank.

---

This invention relates to a shipboard sewage system and, more particularly, to a holding tank provided therein and enabling the system to re-use the contents by recirculating essentially liquids only from the tank. The recirculating tank according to my invention has considerably smaller size and smaller weight to it, as compared to a strict holding tank as conventionally used for various purposes aboard ship.

A difficulty to the owner of a watercraft, especially the small boat owner, is that the disposal of human waste by direct overboard discharge contributes to a serious water pollution problem. So the owner of the small boat, in which the so-called head of the ship is equipped in standard manner with a direct overboard discharge from the toilet or toilets, resorts to use of the overboard discharge only when a permissible occasion arises; it is becoming more and more the general practice to hold all sewage aboard. The wastes, particularly human wastes, are disposed of in port, where shore-side pump out facilities are available.

But a strict holding tank has the indicated disadvantages of both large size and weight. A smaller, lighter recirculating tank design for the stringent conditions of shipboard use hitherto has not only the disadvantage of possibly going unnoticed and thereby overfilling, but other disadvantages due to the outside venting which is necessary and due to the complication from ship motion, especially roll of the ship. Rolling motion subjects a recirculating holding tank to agitation and unsettling of the solids therein, to surging and internal wave motion therein, to spillage to the outside or to accepting outside splash water attempting to enter the tank, or both, to clogging of the tank outlet while functioning to return flushing medium to the toilet for recirculation, and to plugging and clogging in the system elsewhere.

My invention materially reduces or substantially eliminates the foregoing disadvantages, through provision of an essentially non-spilling, quantity indicating, clogging resstant, recirculating holding tank of a design adapted for retro-fit installation in existing equipment or for installation as original equipment, all as will now be described in detail.

Further features, objects, and advantages will either be specifically pointed out or become apparent when, for a better understanding of my invention, reference is made to the following description taken in conjunction with the accompanying drawings, which show a preferred embodiment thereof and in which:

FIG. 1 is a showing, in a view in the direction astern, of a shipboard sewage system embodying the present holding tank invention; and FIG. 2 is a showing of the tank only, viewed as in FIG. 1, but viewed fragmentarily and isometrically to emphasize the tank details.

More particularly in FIG. 1 of the drawings, a shipboard sewage system 10 having a recirculating holding tank 12 is shown connected between a pair of hull openings consisting of the overboard intake 14 and overboard discharge 16 of a vessel 18. The system is primarily adapted for but not necessarily limited to original-equipment or retro-fit installation on watercraft, e.g., small boats including sailboats which are at least large enough to be equipped with a head.

The boat toilet 20 in the system has a standard construction including the regular bowl 22 and a splash baffle 24 therein, and two side connections consisting of the regular toilet suction 26 and discharge 28. A pump 30 having power means 32 such as a timed-switch-operated electric motor or a handle operated rock shaft is connected in the base 33 of the toilet 20 to draw flushing liquid from the suction 26 and return it through a downspraying flushing ring 34 into the mouth of the bowl 22.

The discharge 28 forms the side arm of a regular macerator 36 having a rotary macerating head driven by a vertically disposed power shaft 38, the operation of which is controlled by a time-delayed stopping switch by which maceration lasts at least coextensively in time with and perhaps continues slightly longer than each flushing cycle.

The tank 12, presently illustrated in a fore and aft extending attitude in the vessel as shown, has a manifold end wall 40 which faces forward. A first vent fitting 42 is in one of the opposite upper corners of the end wall 40 and a second vent fitting 44 is in the other upper corner of the end wall 40. A tank pump out fitting 46 is in the bottom portion of the wall generally on the same side of the tank as the second vent fitting 44.

The wall 40 carries a brass manifold, not shown, centrally located on the outside, in which manifold an intake fitting 48 is mounted generally on the side with the pump out and the second vent 44, and in which a pick up fitting 50 is mounted on the opposite side of the manifold.

The connections and interconnections in the system are made by pipes and hoses as appropriate. A connecting line 52 leading from the overboard intake 14 and a connecting line 54 leading from the tank pick up 50 form a three way junction with a connecting line 56 to the toilet suction 26, and they supply the latter line 56 with flushing liquid drawn from either the intake or the pick up. A two-way hand valve 58 in the three way junction has a normal position as shown in solid lines in FIG. 1 enabling the toilet to selectively draw from the tank 12, and a preliminary position reached with 90° counterclockwise rotation of the valve which intercommunicates the overboard intake to the toilet suction for initial flushing sufficient to introduce a preliminary charge into the holding tank 12 when restarting the system after the tank has been emptied.

The connections 56 and 54 as provided can consist of small hoses equipped with suitable couplings at the ends, and a connection 60 between the toilet discharge 28 and the tank inlet fitting 48 can be made by means of a large diameter hose.

A connection 62 which can include a pump 64 interconnects the tank pump out fitting 46 and the overboard discharge 16 and provides a forced clean out connection for the system. A line 66 for dockside attachment is connected to the clean out connection to form a second three way junction into which a two way, three position hand valve 68 is connected. The valve is shown in a solid line blocking position, from which it is selectively movable clockwise as viewed in FIG. 1 to intercommunicate the tank pump out to the line 66 or movable counterclockwise to intercommunicate the tank pump out to the overboard discharge 16. The line 66 leads upwardly to a waste deck fitting, which is flush mounted topside in the vessel for periodic tank clean out use whereby the waste is pumped out into storage facilities on shore. The valve connection to the overboard discharge 16 is opened only under exceptional circumstances because the general practice is to meticulously avoid polluting the water with raw sewage.

A vent fitting extension 70 leads from an external venting point, not shown, on the port side of the vessel as illustrated diagonally down to that vent fitting 42 which is on the opposite side of the tank 12. A complementary vent fitting extension 72 leads from an external venting point on the starboard side of the vessel as illustrated diagonally down to the second vent fitting 44 on the more remote or opposite side of the recirculating holding tank 12.

In the assumed case wherein the vessel 18 rolls for example to port, causing it to take the angled attitude shown with respect to the always horizontal water line 74, it will be appreciated that as the vent extension 70 on the port side lowers closer to the water line the first vent fitting 42 separates farther above the surface of the liquid in the tank 12. At the same time, the vent extension 72 on the starboard side rises to a nearly more vertical position as the surface of the liquid in the tank 12 moves closer to the second vent fitting 44. As a consequence, the tank 12 is a non-spilling tank especially suitable for stringent conditions of sailboat use and insuring venting in the normal attitude of roll. That is to say, the vent extension at the side of the vessel which transitorily dips is connected to the vent fitting at the highest point in the tank, and so the vent fitting cannot allow the tank to spill because the fitting is not immersed in the tank liquid. The vent fitting which transitorily tends to become immersed in tank liquid is connected to the vent extension attaining a more acute vertical angle, and so the vent extension cannot allow the tank liquid to spill because the extension has a near vertical attitude above the tank.

As a precaution against flow the other way, i.e., taking on water through the vents so as to flood the tank 40, each vent extension at the upper end is formed with a half loop of inverted U-shape 76. The external venting points of the extensions 70 and 72 can be made through hull fittings fixed in opposite sides of the vessel 18 above the water line, and each half loop because of its inversion prevents outside splash water from entering the tank 40 through the associated vent extension.

As shown in FIGS. 1 and 2, the tank 40 has a longitudinally extending vertical baffle screen 78 therein dividing the interior into a receiving chamber part 80 and a pick up chamber part 82. Secured to the receiving chamber side thereof, the screen 78 carries a wave counteracting baffle 84 of U-shaped impervious construction. The baffle 84 comprises a vertical attachment base 86 which is transversely disposed to the manifold wall 40 and two parallel vertical leg panels 88 which are disposed transversely between the two side walls 90 and 92 of the tank on the sides adjacent the first and second fittings 42 and 44, respectively.

The tank 40 includes a bottom wall 94, on which the tank is supported by means of a fore and aft extending mounting tray 96 preferably made of wood. A set of hold down straps 98 is trained over the tank so as to pass over a top wall 100 thereof and is secured by screws to the tray 96.

The tank further includes a rear wall 102, and a centered brass manifold plate 104 secured fluid tight to the front wall 40 by means of screws. The intake and pick up fittings 48 and 50 are fixed in the brass plate and the intake fitting 48 registers with and extends into the receiving chamber part 80 of the tank.

The pick up fitting 50 cooperates with the pick up chamber part, and a rigid straight pick up arm 106 forms an internal extension of the fitting to function as a suction pipe. The pick up arm 106 has a transverse portion 108 including a rotary joint made of interfitting relatively rotatable sleeves which are carried by the fitting 50 and which define a horizontal pivot axis 110 at the fixed end of the arm. The starting level of the liquid in the tank 40 is about one-third of the way up, and so are the sleeves and fitting 50 to insure that they are at all times immersed to produce suction.

The arm 106 has a free outer end including a downturned mouth extension 112 which carries a hollow float ball 114. The float ball 114 causes the mouth 110 to follow the liquid level in the tank but at a point at all times slightly below the surface. Therefore, only the supernatant liquid is picked up, and it passes from the pick up fitting 50 in the direction indicated by an arrow in FIG. 2.

The receiving chamber part 80 receives the toilet discharge through the fitting 48 in the direction indicated by an arrow. The tank is preferably made of white translucent polyethylene plastic. The impervious baffle 84 is preferably made of bent, one-piece copper plate and the plate counteracts wave motion both longitudinally and transversely in the tank.

One of the critical components of the tank 40 is the dividing baffle screen 78, which is sized to have a minimum area of 10 square inches per gallon capacity of the tank and preferably has about 24 square per gallon. More specifically, in an eight gallon tank, which is the one illustrated in FIG. 2, the baffle preferably should have about 190 square inches of area. Roll of the ship causes tank liquid to wash through the screen in alternate directions imparting a self cleaning action thereto.

After the tank 40 has been emptied during one of the clean out and charge fill cycles previously described, it is desirable occasionally during such a cycle to disconnect the vent extension 70 and introduce the preliminary charge to the tank through the fitting 42 so as to positively reverse flush through the screen 78.

Separation of the waste so that primarily liquid will be recirculated is accomplished in large measure by the receiving chamber part 80 in which the heavier solids settle out of the incoming waste. The baffle screen 78 thereafter screens out many other solids. Finally the float mounted, swinging pick up arm functions to allow only surface liquid to be drawn from the pick up chamber part of the tank.

Overfilling of the tank from continued usage is readily avoided because the translucent material thereof allows the tank condition to be inspected at a glance and emptied when the quantity held makes pump out necessary.

In case the valve 58, from the solid line position shown in FIG. 1, is rotated and left in the ninety degree counterclockwise position, the tank 40 in the sewage system will function solely as a holding tank, in which case only about 25% as many toilet uses can be accomplished before the tank is full. No additives are necessary or desirable, such as a chemical deodorant added to the tank contents when the tank serves strictly as a holding tank.

However, when the tank 40 is being used for recirculation, an odorizing colorant of conventional composition is added in the amount of about two ounces per gallon of starting volume. Also, about two more ounces of the odorizing colorant to the gallon of liquid present are added to the system when the tank is about three quarters full. Between the time at which a tank of convenient size, for instance, an eight gallon tank, is first filled to the starting level (e.g., where it holds about three gallons) and the time by which it has accumulated waste sufficient to fill the tank, such eight gallon recirculating tank will have accommodated from about 70 to 100 uses of the toilet in the system.

There is no danger any time in employing either vent fitting for admitting therethrough the starting charge into the tank, because the other vent will be effective at the time to relieve pressure in the tank and prevent bursting.

The embodiments of the invention in which an exclusive property or privilege is claimed are defined as follows:

1. For use with a shipboard toilet, a recirculating holding tank of translucent plastic, having:
   a generally vertical longitudinally extending baffle screen internally dividing the tank into a receiving chamber part at one side and a pick up chamber part at one side; said tank internally defining dimensions for the dividing screen area, proportioned and arranged relative to the average internal width of the tank to insure at least about 10 square inches of screening area per gallon of tank capacity;
   means of connection to the toilet each at a point in an end wall of the tank and communicatively extending one internally of the pick up chamber part, and another into the receiving chamber part of the tank for receiving discharged waste carrying liquid flushed thereto; the internal extension of said one tank connection comprising a pick up arm having an end fixed at said point in an end wall of the tank, and having a free end; and
   a float secured to the pick up arm at the free end thereof whereby the latter will, by swinging the pick up arm about the fixed end thereof, follow and draw from only the surface layer of liquid in the pick up chamber part.

2. The invention of claim 1, characterized by: vent means on opposite sides of the tank each at an upper point in an end wall thereof and mutually crossing so that each extends externally and generally diagonally upwardly from one side of the tank for leading to a venting point at the side of the ship, whereby each said point at the side of the ship communicates through a vent means extension as aforesaid to that vent means which is on the relatively more remote side of the tank thereto.

3. The invention of claim 1, the pick up arm characterized by a downturned mouth extension, at the free end, opening at a point closely spaced apart from and at all times below the water line on the float.

4. The invention of claim 2, further characterized by:
   the tank having a fore and aft extending attitude as installed on shipboard, one vent means extension and the associated vent means communicating through the forward end wall of the tank with the pick up chamber part of the tank; and
   means forming a disconnectible joint between the just said vent means and extension for removal of the latter so as to counterflow the baffle screen by flushing same with liquid introduced through the just said vent means.

5. The invention of claim 3, the pick up arm characterized by a laterally extending portion leading therefrom to the fixed end, and forming a rotary joint establishing a generally transverse horizontal axis about which the pick up arm swings in up and down movement.

6. The invention of claim 1, characterized by: a generally U-shaped wave-counteracting baffle fixed with respect to the baffle screen on the receiving chamber side of the latter, said baffle having vertically disposed base and transverse leg portions in positions located generally crosswise between the vertical walls of the tank.

7. For use installed in original equipment or as retrofitted in existing equipment of a shipboard sewage installation, the combination of:
   a hull overboard intake and discharge;
   a toilet having a suction and discharge;
   a holding tank having a pick up, an intake, and a pump out;
   three way connecting line means to the respective overboard intake, toilet suction, and tank pick up and forming a first common junction;
   connections respectively between the toilet discharge and tank intake, and between the tank pump out and the overboard discharge, the latter connection comprising a clean out connection;
   a line for dockside attachment connected in said clean out connection to form a second common junction;
   a valve connected in said first common junction having a normal position intercommunicating the tank pick up to the toilet suction for regular flushing, and a preliminary position intercommunicating the overboard intake to the toilet suction for initial flushing sufficient to introduce a preliminary charge of liquid in the holding tank; and
   a valve connected in said second common junction effective selectively to intercommunicate the tank pump out to said dockside attachment line for periodic tank clean out generally or to intercommunicate the tank pump out to said overboard discharge on occasion.

8. The combination of claim 7, characterized by: a pump connected in said toilet suction and drawing through the valve in the first common junction of the three way connecting line means for selectively drawing from the tank pick up or from the overboard intake.

9. The combination of claim 8, further characterized by: a pump connected in said tank pump out upstream of the valve in said second common junction, for pumping waste carrying liquid through the just said valve selectively to said dockside attachment line or to said overboard discharge.

10. The combination of claim 7, characterized by: separate vents in a plurality of diagonally opposite upper corners of the holding tank.

11. The combination of claim 10, further characterized by: said separate vents having mutually crossing extensions each extending externally and generally diagonally upwardly from one side of the tank for leading to a venting point at the side of the ship, whereby each said venting point at the side of the ship communicates through a vent extension as aforesaid to that vent which is on the relatively more remote upper corner of the tank thereto.

References Cited

UNITED STATES PATENTS

| 1,303,358 | 5/1919 | Montgomery | 4—10X |
| 2,676,666 | 4/1954 | Howe | 4—10X |
| 2,858,939 | 11/1958 | Corliss | 4—10X |
| 3,112,497 | 12/1963 | Call | 4—10X |
| 3,154,796 | 11/1964 | Bruce | 4—10X |
| 2,195,149 | 7/1965 | Carlson | 4—10 |
| 3,318,248 | 5/1967 | Rembold | 4—10X |
| 3,320,621 | 5/1967 | Vita | 4—10 |
| 3,440,669 | 4/1969 | Boester | 4—10 |
| 3,472,390 | 10/1969 | Pall et al. | 4—10X |

LAVERNE D. GEIGER, Primary Examiner

H. K. ARTIS, Assistant Examiner